C. S. SAKANASHI.
DIRIGIBLE SPOTLIGHT FOR MOTOR VEHICLES.
APPLICATION FILED DEC. 13, 1920.
1,381,342.
Patented June 14, 1921.
2 SHEETS—SHEET 1.
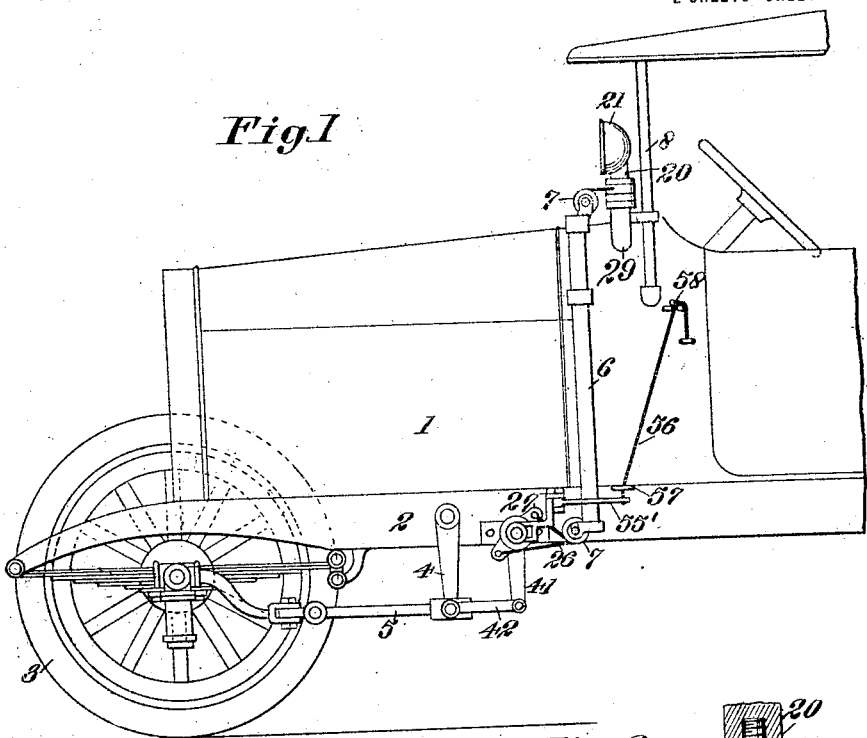
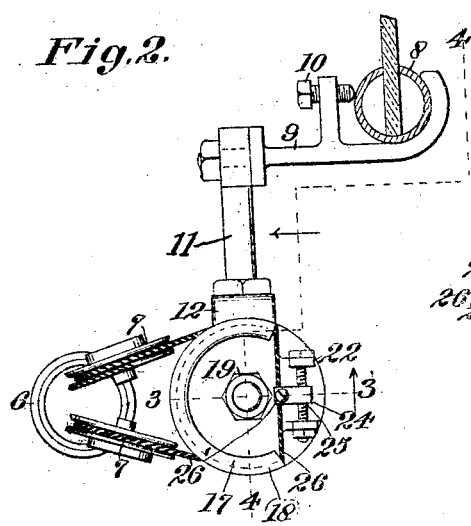
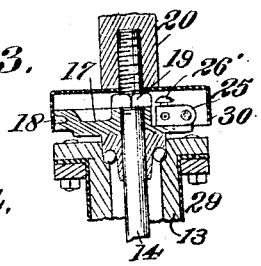
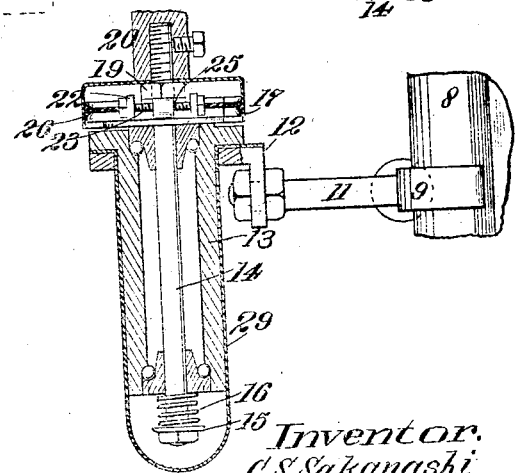
Inventor.
C. S. Sakanashi
By Acken & Totten
Attorneys

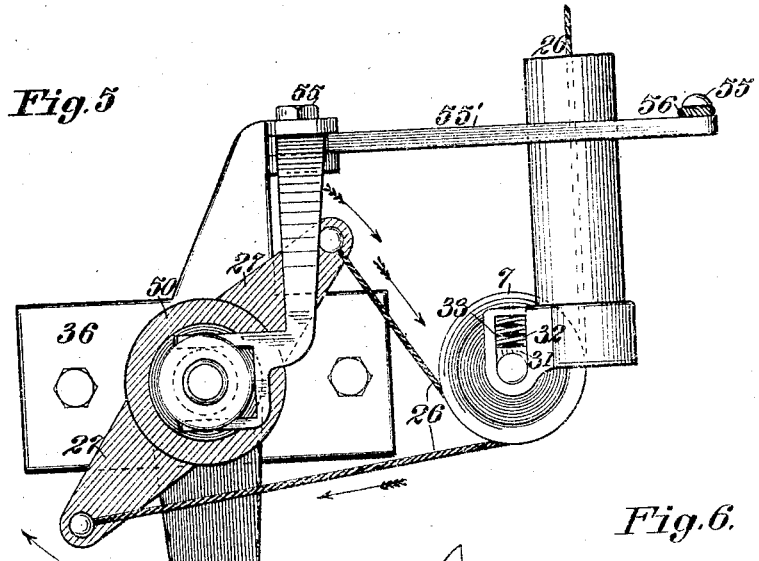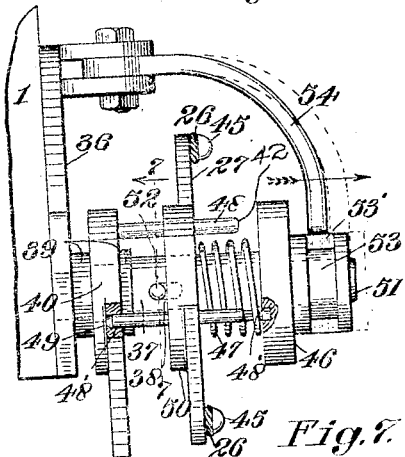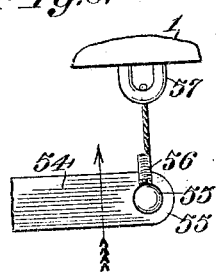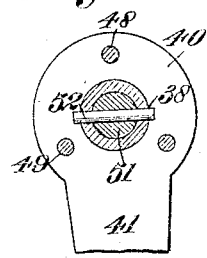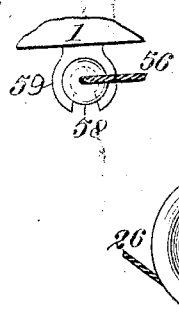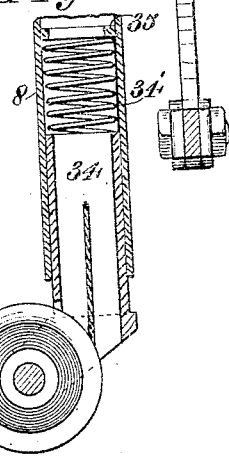

UNITED STATES PATENT OFFICE.

CHARLES S. SAKANASHI, OF SAN MATEO, CALIFORNIA.

DIRIGIBLE SPOTLIGHT FOR MOTOR-VEHICLES.

1,381,342.

Specification of Letters Patent.  Patented June 14, 1921.

Application filed December 13, 1920.  Serial No. 430,229.

*To all whom it may concern:*

Be it known that I, CHARLES S. SAKANASHI, a subject of the Emperor of Japan, residing at the city and county of San Mateo and State of California, have invented certain new and useful Improvements in Dirigible Spotlights for Motor-Vehicles, of which the following is a specification.

The present invention relates to mechanism for causing a spot light within convenient reach of the vehicle operator, preferably adjacent the steering compartment of the vehicle to turn or move in accordance with the direction of travel of the vehicle enabling the roadway ahead in making turns to be illuminated and to permit the driver to illuminate signs and the like alongside the roadway, or license numbers on passing vehicles.

The object of this invention is to provide a construction preferably operated from the main steering gear by flexible members such as cables and the like, providing a construction which is capable of being manufactured at little cost, and one which is constructed without gears or other like expensive mechanisms which materially increase the cost of devices of this type now on the market.

Another object is to provide a take-up or adjustment between the cable mechanism and the lamp support whereby the position of the light relative to the vehicle steering gear may be readily adjusted without changing the connection between the light and the steering gear.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

In the drawings disclosing one embodiment of the invention:—

Figure 1 is a view in side elevation of the preferred embodiment of my invention applied to the steering gear of a vehicle, and illustrating the same with the vehicle fender removed.

Fig. 2 is a plan view of a portion of the mechanism.

Fig. 3 is a sectional view taken on line 3—3 of Fig. 2.

Fig. 4 is a sectional view taken on line 4—4 of Fig. 2.

Fig. 5 is a view of the connection between the vehicle steering arm and the spot light operating mechanism illustrating the form of clutch mechanism desired to be employed.

Fig. 6 is a view in front elevation partly in section of the clutch mechanism.

Fig. 7 is a sectional view on line 7—7 of Fig. 6.

Fig. 8 is a view of a portion of the clutch throw-out lever with the flexible operating member connected therewith.

Fig. 9 is a view in detail of the holding mechanism for the clutch throw-out lever.

Fig. 10 is a sectional view of the tensioning means for the flexible member.

In the drawings, wherein like characters of reference designate corresponding parts, 1 indicates the body, 2 the frame and 3 the front steering wheels of a motor driven vehicle. The vehicle is provided with a main steering gear lever 4 connected with the front wheels through the usual drag link 5 and the well known steering mechanism. Extending vertically, either exteriorly or interiorly of the body 1 of the vehicle is a tubular guide 6, provided at its opposite ends with grooved idlers or wheels 7. To the wind shield standard 8 or to any other portion of the vehicle body adjacent the steering wheel is preferably secured a supporting bracket 9 held in position by suitable mechanism such as a clamp nut 10, and this bracket preferably is disposed in a horizontal position. Extending laterally from the bracket 9 and free to rotate axially in a horizontal plane is a support 11, to the outer end of which is secured in any suitable manner a mounting plate 12. Extending through an opening in the bracket 12 is a tubular support 13 through and above which extends a threaded shaft 14 which carries on its lower end a tension nut 15 between which and the lower end of the member 13 is interposed a tension spring 16. To that portion of the shaft 14 immediately above the upper surface of the member 13 and mounted to rotate about said upper end of the member 13 is a segmental plate 17, having a grooved periphery 18, said plate being held by a nut 19, and to the extreme upper end of the shaft 14 is detachably secured, as by threaded connection, the standard 20 of a suitable dirigible lamp 21 of any desired construction.

It will be observed from Fig. 2 that the grooved periphery of the plate 17 falls short of extending completely around the same, and at said point the plate is provided with the upwardly extending lugs 22 disposed in spaced parallel relation, and between which extends a threaded adjusting screw 23 mounting an adjusting nut 24, which, on the rotation of the screw 23 is adapted for movement over the surface of the plate 17 transversely of said member 14.

Through an opening 25 in the nut 24 is adapted to pass a flexible member 26 receivable on the axial rotation of the plate 17 within the peripheral groove 18, as illustrated in Fig. 2, said flexible member 26 being held in the nut in any suitable manner as by a clamp screw 26'. The portions of the flexible members 26 extending from opposite sides of the plate 17 pass over the member 7 at the upper end of the tube 6 through the tube and over the members 7 at the lower end thereof, they being connected as in Figs. 5 and 6 of the drawings, to the opposite ends of the radially disposed arms 27. To conceal the lower portion of the member 13, the nut 15 and spring 16 there is detachably secured to the member 13 in any suitable manner either by threading or frictional connection, a suitable tube 29 which forms a handle when it is desired to manually operate the lamp 21. To conceal the plate 17, I position thereover a flanged plate 30 which extends to a point to overlie the groove 18, and said plate is capable of axial movement about the shaft 14, thus on the operation of the shaft 14 through the flexible connection 26, the member 30, through which the connection 26 extends, remains stationary and the plate 17 rotates therein. To maintain the flexible connection 26 under tension at all times to insure successful operation of the apparatus, I mount the wheels 7 preferably at the lower end of the guide 6 in suitable blocks 31 positioned within vertical guides 32, and normally held downwardly by coiled springs 33, this construction being particularly illustrated in Figs. 1 and 5.

A modified structure for accomplishing this purpose is illustrated in Fig. 10, and the same consists in providing a lower tube section 34 telescoping in the main section, and the lower section carrying the wheel 7 and normally forced downwardly by a coiled spring 34' within the main section, the spring bearing at one end of the upper section 34 and at its upper end against a ring 35. This construction also enables the flexible member to operate within the tube 6 and normally separates the axes of rotation of the wheels 7 at opposite ends of the tube, thus maintaining the flexible members under tension.

To interrupt the operation of the lamp, in synchronism with the turning of the vehicle steering wheels during the day, or at such other time as it is desired to permit the lamp to remain stationary, I provide a clutch mechanism between the vehicle steering gear and the point of operative connection of the flexible members, and the preferred embodiment thereof is constructed as follows:—

Secured to the frame 2 is a plate 36, Figs. 1, 5 and 6 of the drawings, and outwardly from the same extends a tubular sleeve 37 provided in its wall adjacent its inner end with the pin receiving slots 38. Mounted on the inner end of the sleeve to rotate axially about the same between the retainers 39 is a lever hub 40 carrying a lever 41 connected through a link 42 with the member 5. Mounted on the sleeve 37 to slide longitudinally thereof, and to rotate axially thereon is a clutch collar 50, from diametrically opposite sides of which extend the lateral arms 27, to the end of each one of which is connected, as at 45, one end of the flexible connection 26. Carried by the end of the sleeve 37 is a retaining disk 46, and surrounding the sleeve 37 and bearing against the disk and the outer face of the lever hub 40, is a spring 47 for normally engaging said clutch members. Suitable pins 48 project from opposite sides of the collar 50, and the ends 49 thereof are receivable in recesses 48' in the hub 40 when the clutch is in engaged position. The ends 42 of the pins 48 engage in recesses 48' in the inner face of the disk 46 when the clutch is disengaged, and hold the clutch collar in a predetermined position to insure the proper alinement of the lamp 21 with the vehicle steering wheels 3 when the clutch is again engaged.

A clutch release bolt 51 is longitudinally movable within the sleeve 37 and carries transverse pins 52 operating within slots 38 within the sleeve. The bolt carries on its outer end a grooved head 53 within which is received the forked end of a clutch operating lever 54 fulcrumed as at 55 to the plate 36. The end 55' of the lever 54 connects as at 55 with an operating cord 56, which extends laterally from the edge thereof, and operates in a guide 57 associated with the vehicle. The upper end of the operating cord extends within convenient reach of the vehicle operator, and is provided with a retaining button or member 58 receivable in a slotted retainer 59 when it is desired to retain or hold the clutch in disengaged position. An upward pull on the cord 56 imparts a movement to the forked end 53' of lever 54, to move the bolt 51 outwardly in the sleeve to cause the pin 52 thereof to move the collar 50 outwardly on the sleeve against the tension of the spring 47 and thus release the clutch with the ends 48 of the pins in the recesses in the disk 46. The release of tension on the cord 56 when the vehicle steering wheels are directed to steer the vehicle straight ahead enables the spring to force the clutch into engagement with the openings in the lever hub 40.

Having thus described my invention what I claim as new and desire to secure by Letters Patent of the United States is:—

1. In combination with the steering mechanism of a motor vehicle, a support secured to the vehicle, an auxiliary rotatable supporting member journaled therein, a lamp structure secured to the supporting member and rotatable therewith, a segmental plate secured to rotate with said supporting member and provided with a grooved periphery, a flexible operating member extended from opposite points on said plate and receivable in said groove on the axial rotation of the supporting member, said flexible member being operatively connected to said steering mechanism to axially rotate said support on the operation of said steering mechanism, a nut to which said flexible member is secured, an adjusting screw carried by the plate and held from longitudinal movement thereon, a threaded connection between said screw and nut, and means for maintaining said flexible members under tension.

2. In combination with the steering mechanism of a motor vehicle, a dirigible lamp structure carried by the vehicle, a pair of flexible members extending from said lamp structure, a tubular guide through which said members extend and within which the same operate, said members being disposed angularly from opposite ends of said tube, rollers at the opposite ends of said tube and over which said connections operate, means for normally forcing the centers of axial rotation of the rollers at opposite ends of the tube from each other to maintain said flexible members under tension, a clutch plate adjacent to the lower end of the tube and to opposite points on which said flexible members are secured, a sleeve mounting the plate, a clutch hub on said sleeve, a lever extended therefrom and connected with the vehicle steering gear, means for normally maintaining said clutch hub and plate in engaged relation, and means for releasing the clutch plate and hub to permit the manual operation of the lamp independently of the direction of steering of the vehicle.

In testimony whereof I have signed my name to this specification.

CHARLES S. SAKANASHI.